United States Patent [19]

Kerbs et al.

[11] 4,408,565
[45] Oct. 11, 1983

[54] FEED DISPENSER

[75] Inventors: Brad J. Kerbs, Eureka, Mo.; Kent J. Lanter, Millstadt, Ill.

[73] Assignee: Ralston Purina Company, St. Louis, Mo.

[21] Appl. No.: 355,822

[22] Filed: Mar. 8, 1982

[51] Int. Cl.³ .............................................. A01K 39/01
[52] U.S. Cl. ................................................... 119/52 R
[58] Field of Search ............................ 119/51 R, 52 R

[56] References Cited
U.S. PATENT DOCUMENTS 1,940,010 12/1933 Murray .................... 119/52 R X
2,707,454 5/1955 Wilkinson .................... 119/51 R
3,115,865 12/1963 Parkes et al. .................... 119/52 R Primary Examiner—Hugh R. Chamblee
Attorney, Agent, or Firm—Virgil B. Hill

[57] ABSTRACT

A feed dispenser which is eminently suitable for wild bird feeding may be collapsed to a compact condition for shipment and storage and readily erected for feed dispensing. The feed dispenser or feeder is comprised of a bottom tray with foldably connected end walls, a cover which is releasably supported by the end walls in the erected condition and a replaceable feed container which may be positioned on the feed dispenser tray and then caused to dispense the feed.

10 Claims, 8 Drawing Figures

FEED DISPENSER

BACKGROUND OF THE INVENTION

The present invention relates to animal feeding devices adapted to dispensing dry flowable materials such as grains, seeds, or other particulate feed materials and more particularly to feeding devices for wild birds in an unrestricted outdoor environment.

In general, prior devices for feeding wild birds have comprised a storage compartment for retaining the particulate flowable feed materials safe from deleterious weather conditions, a provision for adding feed materials from time to time to replenish the supply, and an exposed portion of the feed adapted to access by the birds while positioned on a perching element.

The present invention accomplishes the foregoing in a highly satisfactory manner but additionally affords a construction that is readily collapsed for shipment or storage or erected for use without the use of extraneous tools or fastening devices. The invention includes a specially designed feed package or container that is adapted for retention in the feeding device and that can be readily removed when empty for replacement by another like feed package and thus avoid the inconvenience for periodic replenishment of the feed supply from a bulk feed source.

SUMMARY OF THE INVENTION

The invention is a feed dispenser which is particularly suitable for the feeding of wild birds. The feed dispenser or feeder may be constructed of any suitable sheet materials but preferably is formed with a molded plastic bottom tray with integral, foldably connected end walls adapted for folding in flatwise relation to the top of the tray. A cover or roof structure is also conveniently formed from molded plastic and includes front and rear panels integrally connected in folding relation so that they may conform to the top edges or gables of the end walls and also may be extended in planar relation to conform to the bottom surface of the tray for shipment and storage. The roof structure also includes provisions for lockingly engaging the top edges of the end walls or alternatively frictionally engaging the depending bottom edges of the tray in the collapsed condition of the feeder. A feed package contains flowable, dry, particulate feed materials and is conveniently formed from foldable paperboard container stock and comprises a series of rectangular wall panels each having foldably connected end closure flaps thus forming a container having a square transverse section. An adjacent pair of the wall panels have a series of feed dispensing openings arranged adjacent to a common edge. A separable portion of each such panel covers the dispensing openings and is removable after positioning the feed package in dispensing condition in the feeder.

BRIEF DESCRIPTION OF THE DRAWINGS

Further objects and additional advantages of the invention will become apparent from the following description and annexed drawings wherein.

DESCRIPTION OF THE PREFERRED EMBODIMENT

Figure 1:
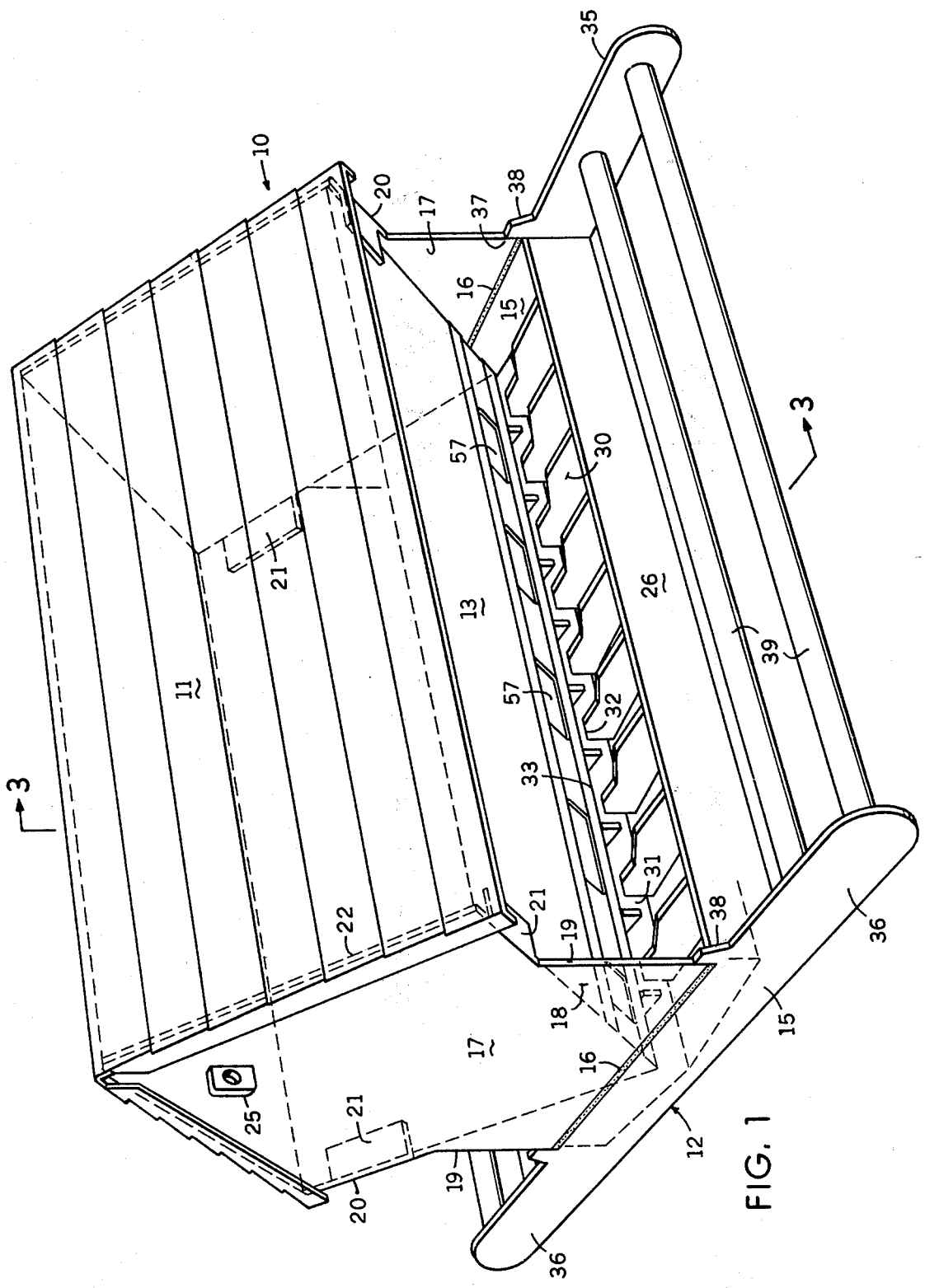
FIG. 1 is a perspective view of the feeder in the erected feed dispensing condition.

Referring to the drawings, numeral 10 designates generally the feed dispenser assembly or feeder. The feeder comprises generally a cover 11, a base 12, and a feed container or package 13 all shown in FIG. 1.

Figure 3:
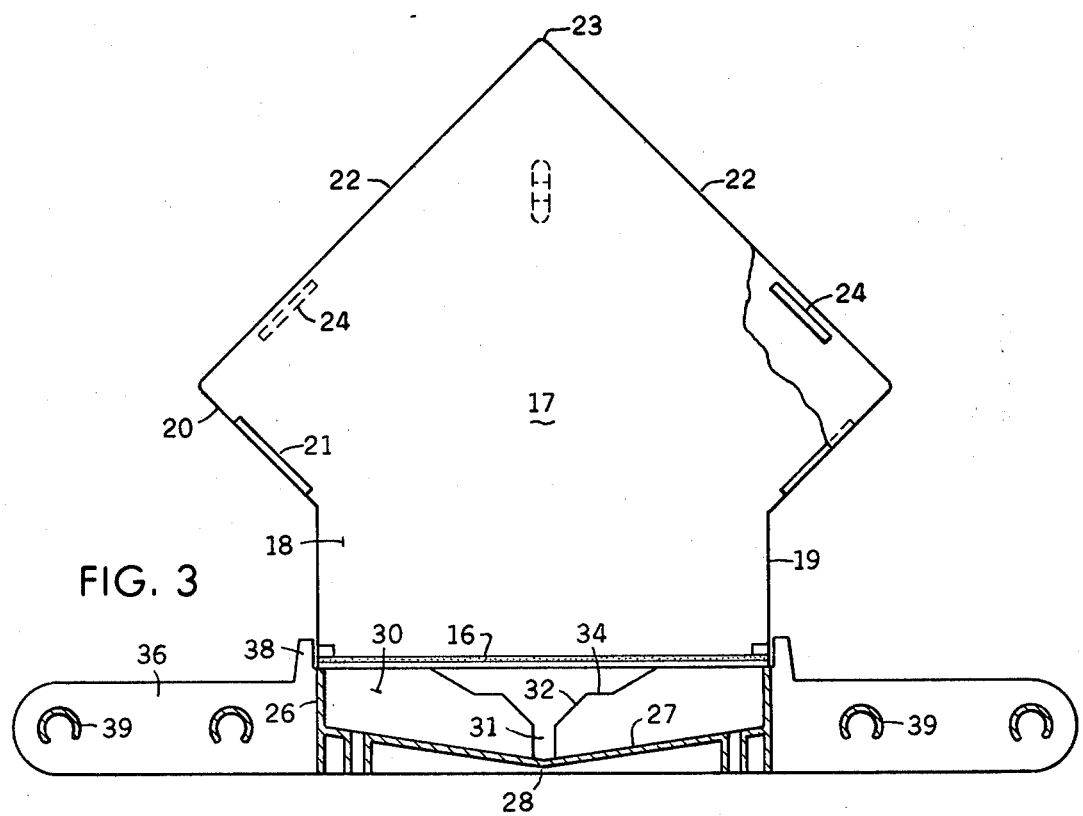
FIG. 3 is a sectional view along the line of 3—3 of FIG. 1.
Figure 4:
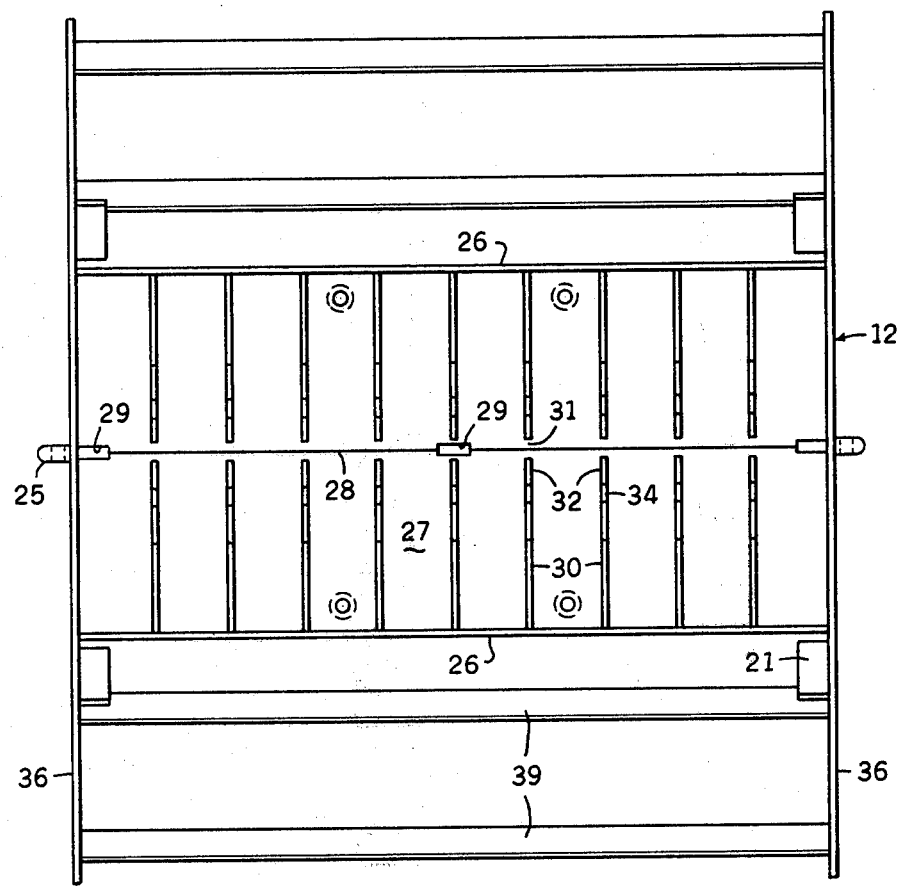
FIG. 4 is a top view of the feed dispenser base section.
Figure 5:
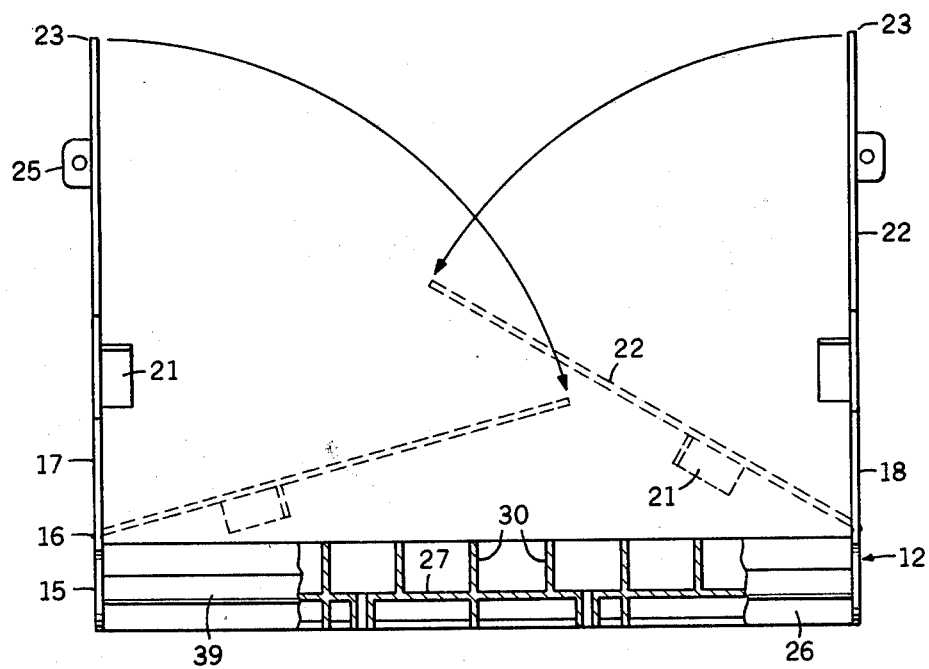
FIG. 5 is a front view of the base shown in partial section.

The base 12 as shown in FIGS. 1, 4 and 5 comprises end panels 15 with top edges 16 defined by a hinge connection to end walls 17. End walls 17 each comprise a lower rectangular portion 18 with side edges 19. The side edges 19 are terminated at their upper ends by soffit edges 20 which are outwardly angularly disposed to conform to the respective walls of the feed package 13. Supporting tabs 21 are connected to the soffit edges and are disposed in normal relation to the end walls 17. The upper ends of the end walls are defined by gable edges 22 terminating in a peak 23 and thus affording supports for the roof structure or cover 11. In the exterior surface of the end walls 17 near the lower ends of the gable edges 22 and overlying the soffit edges 20, there are locking recesses or slots 24, FIG. 3, adapted to releasably engage locking studs of the roof structure which are described hereinafter. Suspending studs 25 are positioned along the vertical medial line of the end walls 17. Alternatively, a pair of suspending studs may be positioned on either side of the medial lines to provide greater stability to the feed dispenser when suspended by a flexible cord or wire.

The side walls 26 of the base 12 together with the end panels 15 define the tray portion of the base 12. The side walls 26 are of sufficient vertical height to retain the feed in the tray while permitting ready access thereto and also to permit the end walls 17 to be folded inwardly in flat wise relation to the tray upper surface as indicated in FIG. 5.

Figure 2:
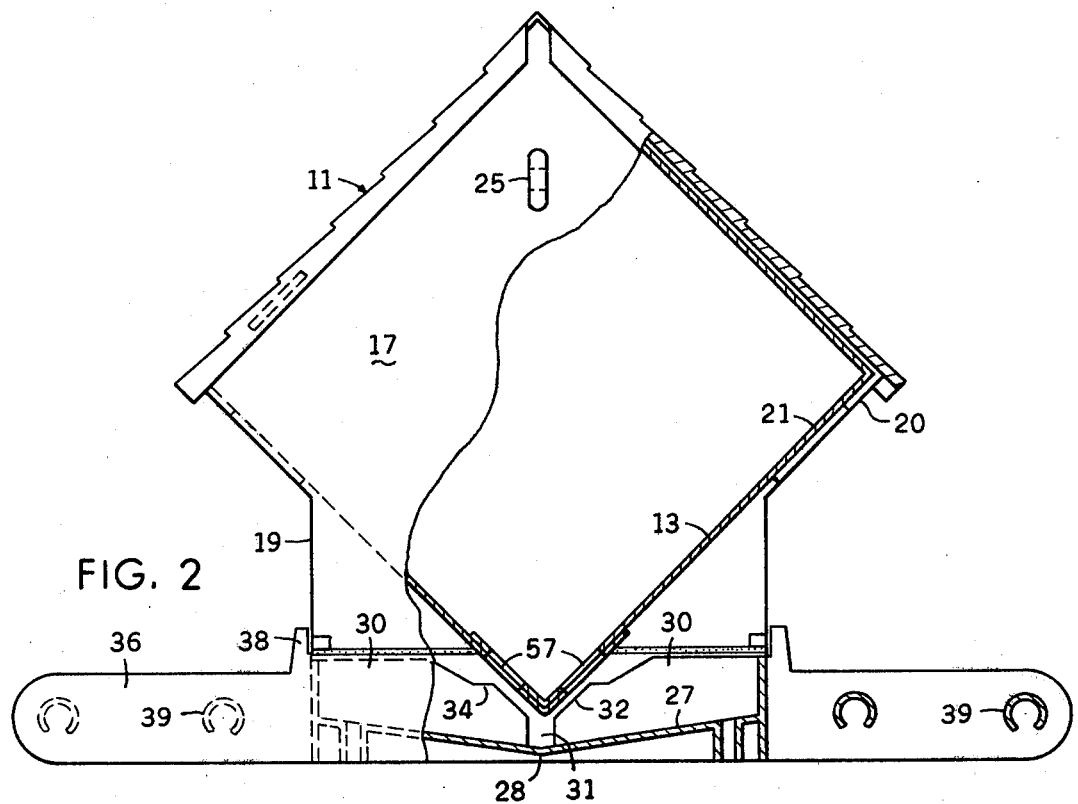
FIG. 2 is an end view of the feeder assembly shown in partial section.

The tray portion of the base 12 also includes bottom panel 27 with longitudinal medial line 28. The bottom panel 27 inclines upwardly from the medial line 28 to the tray side walls 26 as best shown in FIGS. 2 and 3. Drain slots or openings 29 may be provided along the bottom medial line 28 to permit drainage of excess moisture while retaining the particulate feed material which is dispensed from the feed package 13.

The tray portion of the base 12 is also provided with a plurality of lateral dividers 30. The dividers 30 extend between the tray side walls 26 and serve the dual function of supporting the feed package 13 and minimizing the loss of the particulate feed by sidewise billing of the feed by feeding birds. The dividers 30 are provided with medial slots 31 to permit moisture drainage and to permit equalization of the feed between the compartments formed by the dividers.

An upper portion of the slots 31 diverge outwardly on each side to form an included angle of about 90 degrees to provide support edges 32 for retaining a downwardly projecting corner 33 of the feed package as shown in FIG. 1. A portion of the dividers 30 adjacent the upper ends of the support edges 32 is defined by a recessed top edge 34 to provide adequate relief to facilitate removal of a portion of the feed package 13 in the dispensing position as hereinafter described in greater detail.

The base 12 is provided with a perch structure 35 which may conveniently comprise brackets 36 which are lateral extensions on each end of the tray end panels 15. The brackets 36 have lower edges 37 in substantially planar relation to the base 12 bottom surface. Locking lugs 38 on the brackets 36 are disposed adjacent the side edges 19 of the rectangular walls 18 and thus extend above the hinge connections 16. The locking lugs 38 frictionally engage the side edges 19 of the walls 18 to maintain the walls in vertical disposition in the absence of the cover 11 and thereby facilitate positioning of the feed package 13 on the base 12 or during removal of an empty package for replacement thereof. The locking lugs 38 are preferably thickened to provide an arcuate or angulated engaging surface adjacent the wall side edges 19 to insure positive frictional engagement. One or more perch bars 39 extend between the paired brackets on each side of the feed dispenser 10. The perch bars 39 may be of any desired cross sectional configuration but are preferably open towards the bottom as shown in FIGS. 2 and 3 to provide adequate rigidity without the use of excess plastic molding material.

Figure 6:
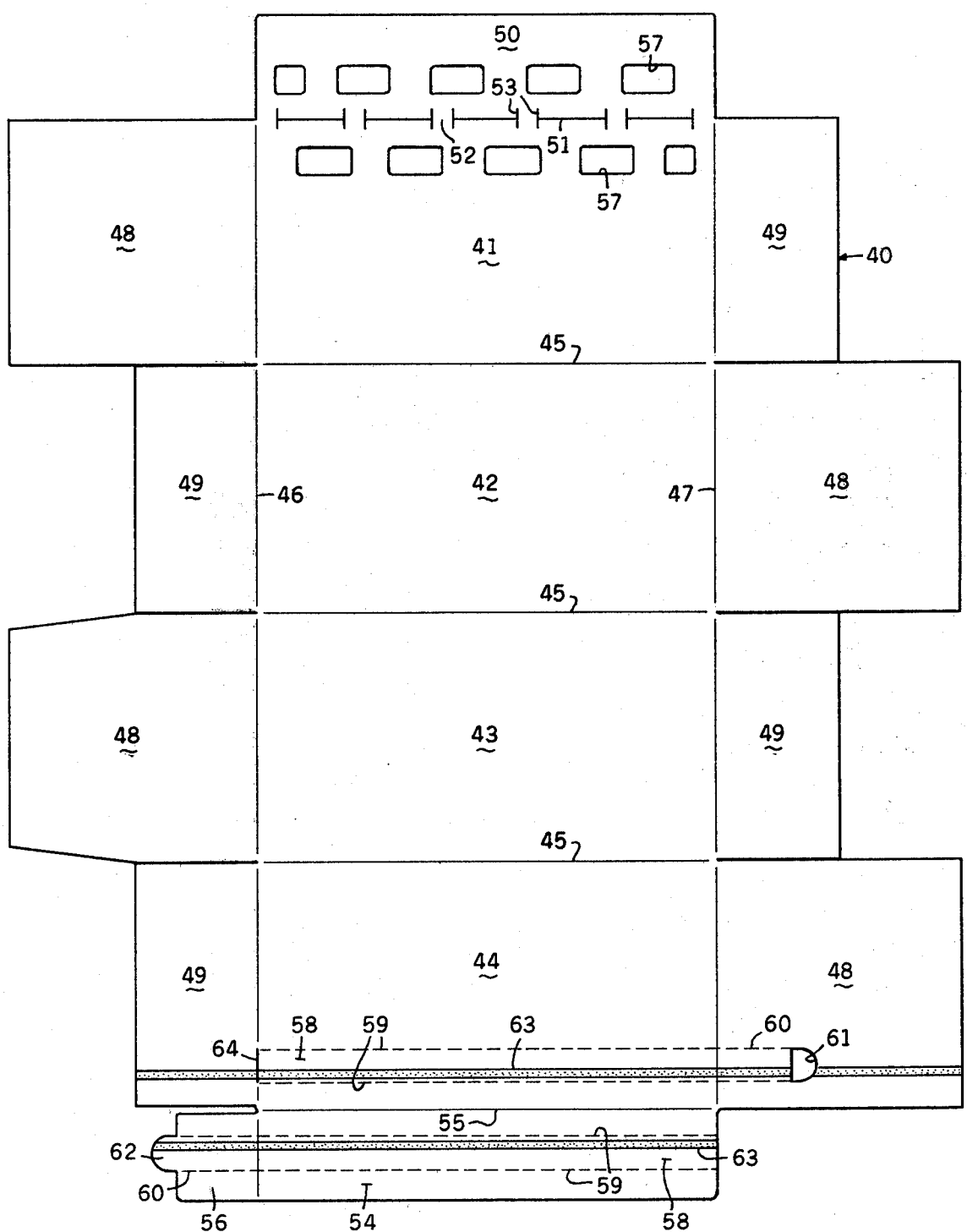
FIG. 6 is a plan view of the container blank prior to assembly into a feed container.

The foldable paperboard blank 40 for forming the feed container 13 is shown in plan view in FIG. 6. The container blank comprises rectangular wall panels 41–44 which are foldably connected by corner score lines 45. The ends of the wall panels 41–44 are defined by end score lines 46 and 47 which serve as the fold connections to end closure flaps 48 and 49. Each of the wall panels 41–44 has one full closure flap 48 on one end and a one-half closure flap 49 on the other end with the full closure flap 48 being disposed on alternate ends of each successive wall panel 41–44. An interior manufactures joint flap 50 is foldably connected by slit score 51 to a corner edge of wall panel 41. The slit score is interrupted by connecting webs 52 which are defined by parallel lateral slits 53. This slit score arrangement relieves the excessive tension and rigidity that would result from the double manufacturers joint connection between the adjacent pair of wall panels 41 and 44 when the wall panels 41–44 are formed into tubular relation to form the rectangular parallelepiped feed container as shown in FIG. 1. The exterior manufacturers joint flap 54 is connected by corner score line 55 to wall panel 44. The flap 54 extends longitudinally beyond end score 46 to form an end closure flap portion 56. An optional construction, not shown, could utilize separate exteriorly applied tape on the wall panels to close the dispensing openings until the tape is removed to effect dispensing of the feed.

Dispensing openings 57 are arranged in spaced parallel relation to corner score 51 and are disposed alternately in wall panel 41 and interior manufacturers joint flap 50 so that feed is dispensed into at least one side of the medial line 28 of each of the compartments formed by lateral dividers 30 in the erected dispensing position of the feed dispenser 10 as shown in FIG. 1. Continuing with FIG. 6, a tear strip or separable portion 58 is located in wall panel 44 and exterior manufacturers joint flap 54 in a manner to overlie the dispensing openings 57 in the erected condition of the container 13. The separable portions 58 are defined by parallel lines of weakness or perforations 59 which may be of various configurations as known in the art to facilitate accurate tearing and removal. Tear tabs 60 are extensions of the separable portions 58 and are disposed in or on the exterior closure flap 48 on each end of the container. In closure flap 48 attached to wall panel 44 the tear tab 60 is terminated by a knockout or finger hole 61. A reinforcing tape 63 is preferably secured to the inner surface of the separable portion 58 with said tape being disposed closely adjacent to the line of weakness 59 next to the corner score 55 which thus becomes the lowermost of the lines of weakness in the dispensing condition of the feed container 13. The reinforcing tape 63 is most conveniently applied to the full dimention of the paperboard blank 40 and thus is determined in effective length by the finger hole 61 and the cut-off slit 64 on end score line 46. In end closure flap portion 56 which is secured on the exterior surface of outermost closure flap 48 which is hingedly connected to wall panel 41, the tear tab 60 is terminated in a finger tab 62. It is to be noted that the tear strips or separable portions 58 and tear tabs 60 are necessarily free of adhesive attachment to the respective subjacent closure flap, manufacturers joint flap or wall panel in the erected condition of the container 13.

In assemblying the feed dispenser 10, the tear tabs 60 are separated from the end closure flaps 48 and positioned outwardly of the respective adjacent pair of wall panels 41 and 44 so that they are accessible when the container 13 is positioned on the base 12 and the cover 11 secured in place. Thus, the exposed tear tabs 60 free of the end walls 17 can be manually grasped to complete removal of the tear strips or separable portions 58 whereby the particulate feed drops directly into the tray of the base 12 without loss of the feed.

Figure 8:
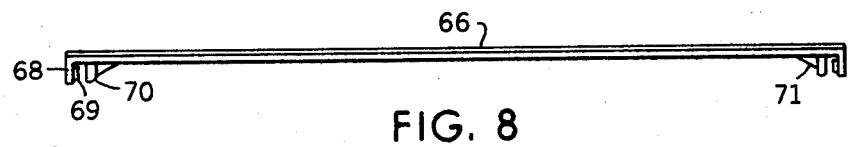
FIG. 8 is an edge view of the cover structure of FIG. 7.
Figure 7:
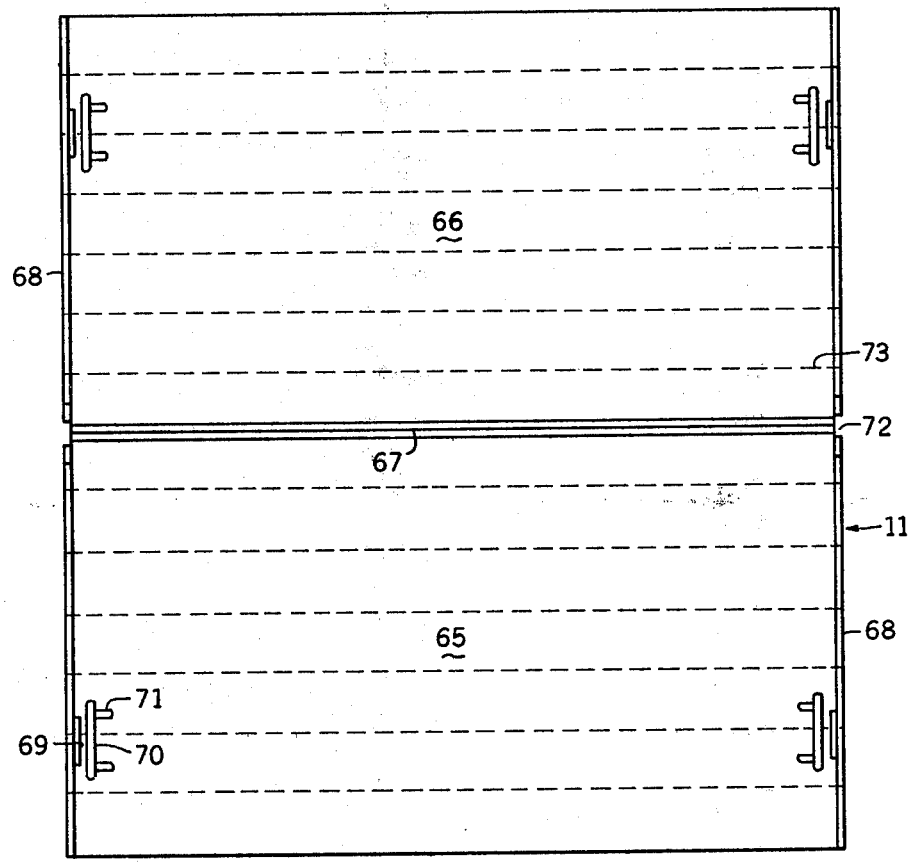
FIG. 7 is a plan view of the interior or underside of the cover or roof structure.

The cover or roof structure 11, shown in FIGS. 7 and 8, is comprised of front panel 65 and back panel 66 which are integrally connected by live hinge 67. The end edges of the front and back panels 65, 66 are provided with depending edge trim 68.

The inner surfaces of the edge trim 68 are provided with locking studs disposed to releasably engage the locking recesses or slots 24 in the end walls 17 in the erected condition of the feed dispenser assembly 10. Back-up bars 70 with reinforcing gussets 71 are provided on the inner surface of the front and back panels 65, 66 in spaced alignment with the locking stud 69 to enhance the engagement of the cover 11 to the gable edges 22 of the end walls 17. The outer surface of the front and back panels 65, 66 may be suitably embossed with a decorative design 73 to simulate shingles or the like.

For storage or shipment the base 12 and cover 11 can be desirably compacted by securing the cover 11 in flatwise relation to the undersurface of the base 12 whereby the cover locking stud 69 and back-up bar 17 frictionally engage the bottom edges 37 of the perch brackets 36 and the end walls 17 are folded inwardly about the hinge connection 16 in substantially flatwise relation to the tray top surface.

The foregoing disclosure is representative of a preferred form of the invention. It is to be interpreted in an illustrative rather than a limiting sense.

What is claimed is:

1. A feed dispenser for flowable particulate feed materials comprising a base, feed container and roof elements, the base including a tray with means for supporting the feed container in a dispensing position, the feed container having means separable in the dispensing position for rendering operative a plurality of openings in the container for dispensing feed into the tray, the base having opposed foldably connected end walls for releasably supporting the roof in overlying relation to the feed container.

2. The feed dispenser of claim 1 wherein the feed container is a disposable folding carton with rectangular wall panels and foldably connected end closure flaps, the end closure flaps being disposed adjacent the respective base end walls, the openings in the container being disposed in alternating relation in an adjacent pair of container wall panels in closely spaced relation to the fold connection between said pair of wall panels.

3. The feed dispenser of claim 1 wherein the means separable in the dispensing position includes a tear tab in a foldably connected end flap of each of said adjacent pair of container wall panels, said end flaps including the tear tabs being in exterior relation to the remaining closure flaps on each end of the container.

4. The feed dispenser of claim 1 wherein the base includes means for frictionally maintaining the end walls in vertical disposition while positioning the feed container in dispensing position or removing the same for disposal.

5. A feed dispenser for flowable particulate feed materials comprising: base, container and roof elements; the base including a tray with upstanding opposed paired end walls, the end walls having top edges defining roof supporting gables in vertically spaced relationship above said tray, the tray having upstanding front and back walls and interior dividers extending between said front and back walls and having top edges which in part define medial recessed portions, the container being removably supported on the top edges of the medial recessed portions in the dispensing position, the container being a rectangular parallelepiped with foldably connected wall panels extending between the tray end walls, means separable in the dispensing position for rendering operative a plurality of openings in the container for dispensing feed into the tray, the roof being releasably secured to the gable top edges.

6. The feed dispenser of claim 5 wherein the container is a disposable folding carton with end closure flaps foldably connected to the respective ends of the wall panels, the openings in the container being disposed in alternating relation in an adjacent pair of container wall panels in spaced relation to the fold connection between said pair of wall panels.

7. The feed dispenser of claim 6 wherein the means separable in the dispensing position includes a tear tab in a end closure flap of each of said adjacent pair of wall panels, said end closure flaps including the tear tabs being in exterior relation to the remaining closure flaps on each end of the container.

8. The feed dispenser of claim 5 wherein the end walls are foldably connected to the tray, means for frictionally maintaining the end walls in vertical disposition while positioning the container in dispensing position or removing the same for disposal.

9. The feed dispenser of claim 5 wherein the means separable in the dispensing position are defined by a pair of parallel lines of weakness.

10. The feed dispenser of claim 9 wherein the separable means include a reinforcing tape adhesively secured thereto, said reinforcing tape being disposed closely adjacent to the lowermost of the lines of weakness in the dispensing condition of the feed container.

* * * * *